US007149755B2

(12) United States Patent
Obrador

(10) Patent No.: US 7,149,755 B2
(45) Date of Patent: Dec. 12, 2006

(54) PRESENTING A COLLECTION OF MEDIA OBJECTS

(75) Inventor: Pere Obrador, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 591 days.

(21) Appl. No.: 10/207,279

(22) Filed: Jul. 29, 2002

(65) Prior Publication Data

US 2004/0019608 A1  Jan. 29, 2004

(51) Int. Cl.
*G06F 17/30* (2006.01)

(52) U.S. Cl. .................. 707/104.1; 707/103; 715/730; 715/723

(58) Field of Classification Search ..... 707/100–104.1; 715/723, 838, 501.1, 730
See application file for complete search history.

(56) References Cited

U.S. PATENT DOCUMENTS

| | | | |
|---|---|---|---|
| 5,521,841 A | 5/1996 | Arman et al. | |
| 5,600,775 A | 2/1997 | King et al. | |
| 5,655,117 A | 8/1997 | Goldberg et al. | |
| 5,710,591 A | 1/1998 | Bruno et al. | |
| 5,751,289 A | 5/1998 | Myers | |
| 5,821,945 A | 10/1998 | Yeo et al. | |
| 5,864,366 A | 1/1999 | Yeo | |
| 5,905,981 A | 5/1999 | Lawler | |
| 5,956,026 A | 9/1999 | Ratakonda | |
| 5,983,218 A | 11/1999 | Syeda-Mahmood | |
| 5,983,236 A * | 11/1999 | Yager et al. ............. | 707/104.1 |
| 5,995,095 A | 11/1999 | Ratakonda | |
| 6,041,147 A | 3/2000 | Mead | |
| 6,044,089 A | 3/2000 | Ferriere | |
| 6,044,365 A | 3/2000 | Cannon et al. | |
| 6,144,375 A | 11/2000 | Jain et al. | |
| 6,166,735 A | 12/2000 | Dom et al. | |
| 6,222,532 B1 | 4/2001 | Ceccarelli | |
| 6,233,367 B1 | 5/2001 | Craver et al. | |
| 6,236,395 B1 | 5/2001 | Sezan et al. | |
| 6,268,864 B1 | 7/2001 | Chen et al. | |
| 6,301,586 B1 | 10/2001 | Yang et al. | |
| 6,317,740 B1 | 11/2001 | Mukherjea et al. | |
| 6,332,144 B1 | 12/2001 | deVries et al. | |
| 6,411,724 B1 | 6/2002 | Vaithilingam et al. | |
| 6,426,778 B1 | 7/2002 | Valdez, Jr. et al. | |

(Continued)

FOREIGN PATENT DOCUMENTS

EP       1213667      6/2002
WO    WO 98/47084   * 10/1998

OTHER PUBLICATIONS

F. C. Li, A. Gupta, E. Sanocki, L. wei He, and Y. Rui, "Browsing digital video." In Proceedings of the SIGCHI conference on human factors in computing systems, pp. 169-176.

(Continued)

*Primary Examiner*—Debbie M. Le

(57) ABSTRACT

Systems and methods of presenting media objects are described. In one aspect, a group of media objects is selected from the collection based upon media object relevance to one or more data structures of a selected media file of indexed, temporally-ordered data structures. The selected media file and the media objects of the selected group are presented contemporaneously. In another aspect, media objects in the collection are grouped into multiple clusters based upon one or more media object relevance criteria. The media object clusters are arranged into a hierarchy of two or more levels. A selected media object cluster is presented contemporaneously. Systems for implementing these media object presentation methods also are described.

27 Claims, 10 Drawing Sheets

U.S. PATENT DOCUMENTS

| | | | |
|---|---|---|---|
| 6,535,889 B1* | 3/2003 | Headrick et al. | 707/104.1 |
| 6,538,665 B1* | 3/2003 | Crow et al. | 715/723 |
| 6,570,587 B1* | 5/2003 | Efrat et al. | 715/723 |
| 6,571,054 B1 | 5/2003 | Tonomura et al. | |
| 6,693,652 B1* | 2/2004 | Barrus et al. | 715/838 |
| 6,721,741 B1 | 4/2004 | Eyal et al. | |
| 6,847,977 B1* | 1/2005 | Abajian | 707/102 |
| 6,892,351 B1* | 5/2005 | Vasudevan et al. | 715/716 |
| 7,076,503 B1* | 7/2006 | Platt et al. | 707/103 R |
| 2001/0018693 A1 | 8/2001 | Jain et al. | |
| 2002/0005866 A1 | 1/2002 | Gorham et al. | |
| 2002/0033844 A1* | 3/2002 | Levy et al. | 345/744 |
| 2002/0069218 A1 | 6/2002 | Sull et al. | |
| 2003/0009469 A1* | 1/2003 | Platt et al. | 707/100 |
| 2003/0078144 A1* | 4/2003 | Gehrke | 482/140 |
| 2004/0122731 A1* | 6/2004 | Mannik et al. | 705/14 |

OTHER PUBLICATIONS

O'Connor et al., "News story segmentation in the fischlar video indexing system," ICIP 2001 Conf. Proceedings, vol. 1 3 of 3 CONF 8,7, pp. 418-421 (Oct. 2001).

Jan R. Erickson, "Jan's Visit to CHINA," <http://home.sprintmall.com/~janerickson/JansChinaWebPage/JansChinaWebPage_Pictures.html>, 9 pages (Oct. 2000).

Ana B. Benitez et al., Object-based meultimedia content description schemes and applications for MPEG-7, Signal Processing: Image Comm., v16, pp. 235-269 (2000).

Qian Huang et al., "Multimedia search and retrieval: new concepts, system implementation, and application," IEEE Trans on Circuits & Systems for Video Tech., v. 10, n. 5 (2000).

* cited by examiner

PRESENTING A COLLECTION OF MEDIA OBJECTS

TECHNICAL FIELD

This invention relates to systems and methods of presenting media objects.

BACKGROUND

Individuals and organizations are rapidly accumulating large collections of digital content, including text, audio, graphics, animated graphics and full-motion video. This content may be presented individually or combined in a wide variety of different forms, including documents, presentations, music, still photographs, commercial videos, home movies, and meta data describing one or more associated digital content files. As these collections grow in number and diversity, individuals and organizations increasingly will require systems and methods for organizing and browsing the digital content in their collections. To meet this need, a variety of different systems and methods for browsing selected kinds of digital content have been proposed.

For example, storyboard browsing has been developed for browsing full-motion video content. In accordance with this technique, video information is condensed into meaningful representative snapshots and corresponding audio content. One known video browser of this type divides a video sequence into equal length segments and denotes the first frame of each segment as its key frame. Another known video browser of this type stacks every frame of the sequence and provides the user with information regarding the camera and object motions.

Content-based video browsing techniques also have been proposed. In these techniques, a long video sequence typically is classified into story units based on video content. In some approaches, scene change detection (also called temporal segmentation of video) is used to give an indication of when a new shot starts and ends. Scene change detection algorithms, such as scene transition detection algorithms based on DCT (Discrete Cosine Transform) coefficients of an encoded image, and algorithms that are configured to identify both abrupt and gradual scene transitions using the DCT coefficients of an encoded video sequence are known in the art.

In one video browsing approach, Rframes (representative frames) are used to organize the visual contents of video clips. Rframes may be grouped according to various criteria to aid the user in identifying the desired material. In this approach, the user may select a key frame, and the system then uses various criteria to search for similar key frames and present them to the user as a group. The user may search representative frames from the groups, rather than the complete set of key frames, to identify scenes of interest. Language-based models have been used to match incoming video sequences with the expected grammatical elements of a news broadcast. In addition, a priori models of the expected content of a video clip have been used to parse the clip.

In another approach, U.S. Pat. No. 5,821,945 has proposed a technique for extracting a hierarchical decomposition of a complex video selection for video browsing purposes. This technique combines visual and temporal information to capture the important relations within a scene and between scenes in a video, thus allowing the analysis of the underlying story structure with no a priori knowledge of the content. A general model of hierarchical scene transition graph is applied to an implementation for browsing. Video shots are first identified and a collection of key frames is used to represent each video segment. These collections are then classified according to gross visual information. A platform is built on which the video is presented as directed graphs to the user, with each category of video shots represented by a node and each edge denoting a temporal relationship between categories. The analysis and processing of video is carried out directly on the compressed videos.

A variety of different techniques that allow media files to be searched through associated annotations also have been proposed. For example, U.S. Pat. No. 6,332,144 has proposed a technique in accordance with which audio/video media is processed to generate annotations that are stored in an index server. A user may browse through a collection of audio/video media by submitting queries to the index server. In response to such queries, the index server transmits to a librarian client each matching annotation and a media identification number associated with each matching annotation. The librarian client transmits to the user the URL (uniform resource locator) of the digital representation from which each matching annotation was generated and an object number associated with each matching annotation. The URL may specify the location of all or a portion of a media file.

SUMMARY

In one aspect, the invention features a method of presenting a collection of media objects. In accordance with this inventive method, a group of media objects is selected from the collection based upon media object relevance to one or more data structures of a selected media file of indexed, temporally-ordered data structures. The selected media file and the media objects of the selected group are presented contemporaneously.

In another aspect of the invention, media objects in the collection are grouped into multiple clusters based upon one or more media object relevance criteria. The media object clusters are arranged into a hierarchy of two or more levels. A selected media object cluster is presented contemporaneously.

The invention also features systems for implementing the above-described media object presentation methods.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Media Management System Overview

Figure 1:
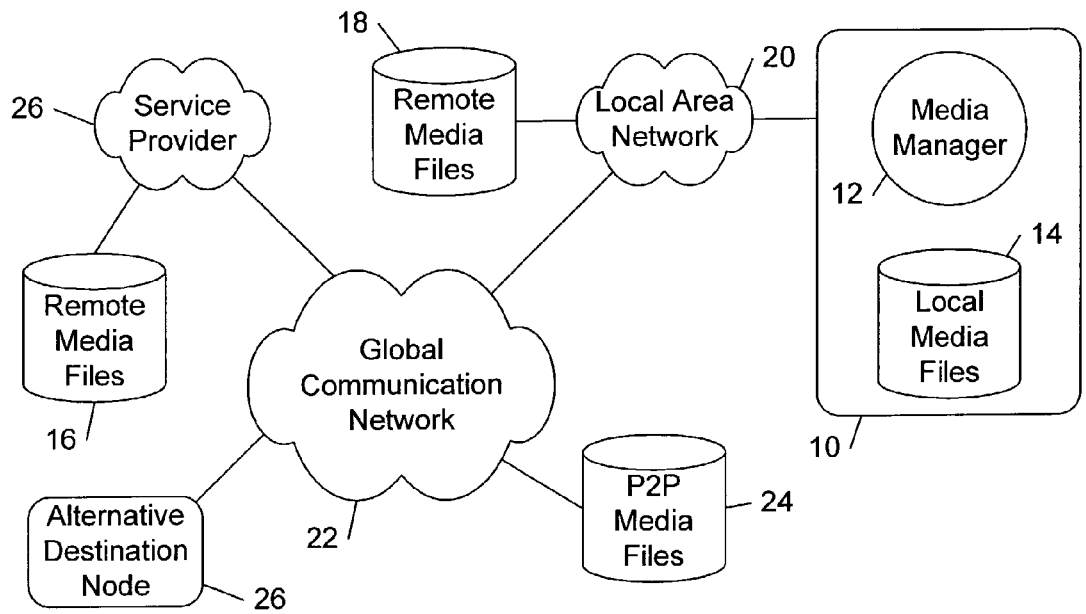
FIG. 1 is a diagrammatic view of a media management node coupled directly to a set of local media files and coupled indirectly to multiple sets of remote media files over a local area network and a global network infrastructure.

Referring to FIG. 1, in one embodiment, a media management node 10 includes a media manager 12 that is configured to enable all forms of digital content in a selected collection of media objects to be organized into a browsable context-sensitive, temporally-referenced media database. As used herein, the term "media object" refers broadly to any form of digital content, including text, audio, graphics, animated graphics and full-motion video. This content may be packaged and presented individually or in some combination in a wide variety of different forms, including documents, annotations, presentations, music, still photographs, commercial videos, home movies, and meta data describing one or more associated digital content files. The media objects may be stored physically in a local database 14 of media management node 10 or in one or more remote databases 16, 18 that may be accessed over a local area network 20 and a global communication network 22, respectively. Some media objects also may be stored in a remote database 24 that is accessible over a peer-to-peer network connection. In some embodiments, digital content may be compressed using a compression format that is selected based upon digital content type (e.g., an MP3 or a WMA compression format for audio works, and an MPEG or a motion JPEG compression format for audio/video works). The requested digital content may be formatted in accordance with a user-specified transmission format. For example, the requested digital content may be transmitted to the user in a format that is suitable for rendering by a computer, a wireless device, or a voice device. In addition, the requested digital content may be transmitted to the user as a complete file or in a streaming file format.

A user may interact with media manager 12 locally, at media management node 10, or remotely, over local area network 20 or global communication network 22. Transmissions between media manager 12, the user, and the content providers may be conducted in accordance with one or more conventional secure transmission protocols. For example, each digital work transmission may involve packaging the digital work and any associated meta-data into an encrypted transfer file that may be transmitted securely from one entity to another.

Global communication network 22 may include a number of different computing platforms and transport facilities, including a voice network, a wireless network, and a computer network. Media object requests may be transmitted, and media object replies may be presented in a number of different media formats, such as voice, Internet, e-mail and wireless formats. In this way, users may access the services provided by media management node 10 and the remote media objects 16 provided by service provider 26 and peer-to-peer node 24 using any one of a wide variety of different communication devices. For example, in one illustrative implementation, a wireless device (e.g., a wireless personal digital assistant (PDA)) may connect to media management node 10, service provider 26, is and peer-to-peer node 24 over a wireless network. Communications from the wireless device may be in accordance with the Wireless Application Protocol (WAP). A wireless gateway converts the WAP communications into HTTP messages that may be processed by service provider 10. In another illustrative implementation, a voice device (e.g., a conventional telephone) may connect to media management node 10, service provider 26 and peer-to-peer node 24 over a voice network. Communications from the voice device may be in the form of conventional analog or digital audio signals, or they may be formatted as VoxML messages. A voice gateway may use speech-to-text technology to convert the audio signals into HTTP messages; VoxML messages may be converted to HTTP messages based upon an extensible style language (XSL) style specification. The voice gateway also may be configured to receive real time audio messages that may be passed directly to the voice device. Alternatively, the voice gateway may be configured to convert formatted messages (e.g., VoxML, XML, WML, e-mail) into a real time audio format (e.g., using text-to-speech technology) before the messages are passed to the voice device. In a third illustrative implementation, a software program operating at a client personal computer (PC) may access the services of media management node 10 and the media objects provided by service provider 26 and peer-to-peer node 24 over the Internet.

As explained in detail below, media manager 12 enables a user to organize and browse through a selected collection of media objects by means of a set of links between media objects. In general, all media objects may be indexed by any other media object in the selected collection. Each link may be browsed from one media object to a linked media object, and vice versa. The set of links between media objects may be generated by a user, a third party, or automatically by media manager 12. These links are stored separately from the media objects in one or more media object linkage data structures that are accessible by the media manager 12.

Content manager 12 may provide access to a selected digital content collection in a variety of different ways. In one embodiment, a user may organize and browse through a personal collection of a diverse variety of interlinked media objects. In another embodiment, content manager 12 may operate an Internet web site that may be accessed by a conventional web browser application program executing on a user's computer system. The web site may present a collection of personal digital content, commercial digital content and/or publicly available digital content. The web site also may provide additional information in the form of media objects that are linked to the available digital content. Users may specify links to be generated and browse through the collection of digital content using media objects as links into and out of specific digital content files. In an alternative embodiment, a traditional brick-and-mortar retail establishment (e.g., a bookstore or a music store) may contain one or more kiosks (or content preview stations). The kiosks may be configured to communicate with media manager 12 (e.g., over a network communication channel) to provide user access to digital content that may be rendered at the kiosk or transferred to a user's portable media device for later playback. A kiosk may include a computer system with a graphical user interface that enables users to establish links and navigate through a collection of digital content that is stored locally at the retail establishment or that is stored remotely and is retrievable over a network communication channel. A kiosk also may include a cable port that a user may connect to a portable media device for downloading selected digital content.

In embodiments in which a user interacts remotely with media manager 12, the user may store the media object linkage data structures that are generated during a session in a portable storage device or on a selected network storage location that is accessible over a network connection.

Figure 2:
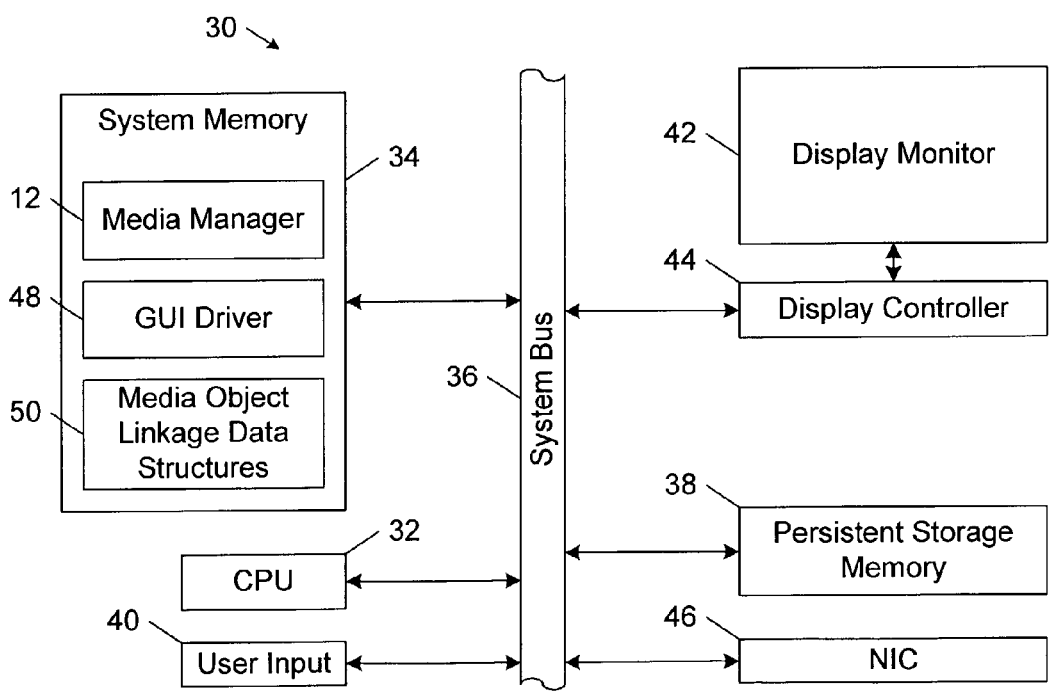
FIG. 2 is a diagrammatic view of a computer system that is programmable to implement a method of managing media objects.

Referring to FIG. 2, in one embodiment, content manager 12 may be implemented as one or more respective software modules operating on a computer 30. Computer 30 includes a processing unit 32, a system memory 34, and a system bus 36 that couples processing unit 32 to the various components of computer 30. Processing unit 32 may include one or more processors, each of which may be in the form of any one of various commercially available processors. System memory 34 may include a read only memory (ROM) that stores a basic input/output system (BIOS) containing start-up routines for computer 30 and a random access memory (RAM). System bus 36 may be a memory bus, a peripheral bus or a local bus, and may be compatible with any of a variety of bus protocols, including PCI, VESA, Microchannel, ISA, and EISA. Computer 30 also includes a persistent storage memory 38 (e.g., a hard drive, a floppy drive 126, a CD ROM drive, magnetic tape drives, flash memory devices, and digital video disks) that is connected to system bus 36 and contains one or more computer-readable media disks that provide non-volatile or persistent storage for data, data structures and computer-executable instructions. A user may interact (e.g., enter commands or data) with computer 30 using one or more input devices 40 (e.g., a keyboard, a computer mouse, a microphone, joystick, and touch pad). Information may be presented through a graphical user interface (GUI) that is displayed to the user on a display monitor 42, which is controlled by a display controller 44. Computer 30 also may include peripheral output devices, such as speakers and a printer. One or more remote computers may be connected to computer 30 through a network interface card (NIC) 46.

As shown in FIG. 2, system memory 34 also stores media manager 12, a GUI driver 48, and one or more media object linkage structures 50. Media manager 12 interfaces with the GUI driver 48 and the user input 40 to control the creation of the media object linkage data structures 50. Media manager 12 also interfaces with the GUI driver 48 and the media object linkage data structures to control the media object browsing experience presented to the user on display monitor 42. The media objects in the collection to be linked and browsed may be stored locally in persistent storage memory 38 or stored remotely and accessed through NIC 46, or both.

Linking Media Objects

Figure 3:
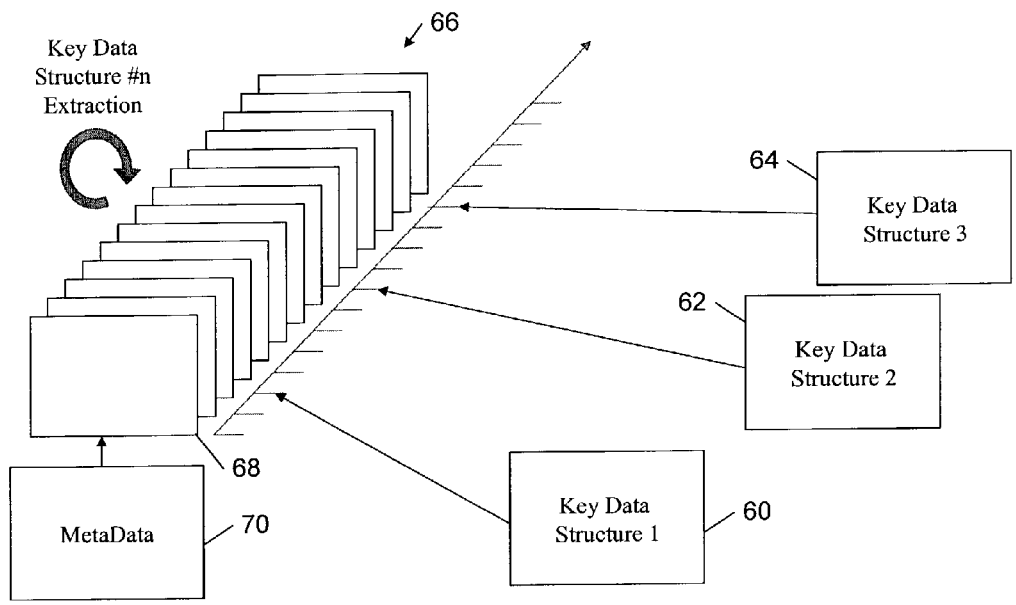
FIG. 3 is a diagrammatic perspective view of a media file of indexed, temporally-ordered data structures and an automatically-generated selection of key data structures.

Referring to FIG. 3, in one embodiment, media manager 12 may be configured to automatically generate a selection of key data structures 60, 62, 64 from a media file 66 of indexed, temporally-ordered data structures 68. Media file 66 may correspond to any kind of digital content that is indexed and temporally-ordered (i.e., ordered for playback in a specific time sequence), including frames of a full-motion video, animated graphics, slides (e.g., PowerPoint® slides, text slides, and image slides) organized into a slide-show presentation, and segments of digital audio. Key data structures 60–64 may be extracted in accordance with any one of a variety of conventional automatic key data structure extraction techniques (e.g., automatic keyframe extraction techniques used for full-motion video). Media manager 12 also may be configured to link meta data 70 with the first data structure 68 of media file 66. In this embodiment, each of the media file data structures 68 is associated with an index value (e.g., a frame number or time-stamp number for full-motion video). Each of the links between media objects 60–64, 70 and media file data structures 68 is a pointer between the index value associated with the media file data structure 68 and the address of one of the linked media objects 60–64, 70. Each link is browsable from a given data structure 68 of media file 66 to a media object 60–64, 70, and vice versa. The links may be stored in one or more media object data structures in, for example, an XML (Extensible Markup Language) format.

Figure 4:
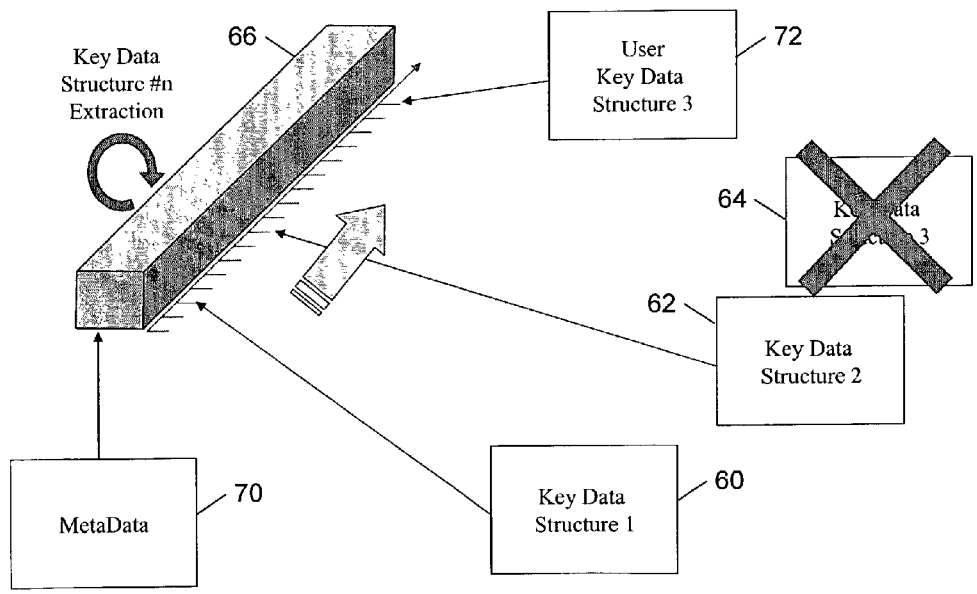
FIG. 4 is a diagrammatic perspective view of the media file of FIG. 3 after the selection of key data structures has been modified by a user.

As shown in FIG. 4, in one embodiment, media manager 12 is configured to modify the initial selection of key data structures in response to user input. For example, in the illustrated embodiment, a user may remove key data structure 64 and add a new key data structure 72. In addition, a user may change the data structure 68 of media file 66 to which key data structure 62 is linked. In this embodiment, the data structures 68 of media file 68 preferably are presented to the user in the graphical user interface as a card stack. In this presentation, the user may select one of the data structures 68 with a pointing device (e.g., a computer mouse) and media manager 12 will present the contents of the selected data structure to the user for review. In other embodiments, the data structures 68 of media file 66 may be presented to the user in an array or one-by-one in sequence.

Figure 5:
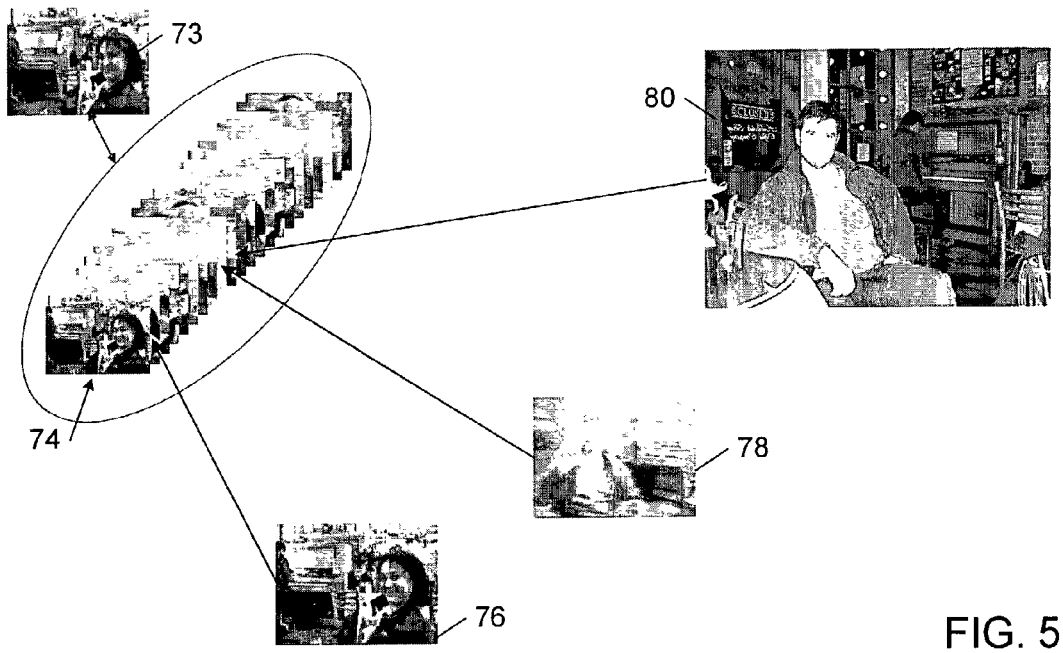
FIG. 5 is a diagrammatic perspective view of an indexed media file containing a sequence of full-motion video frames, a selection of keyframes, and a high resolution still photograph.
Figure 6:
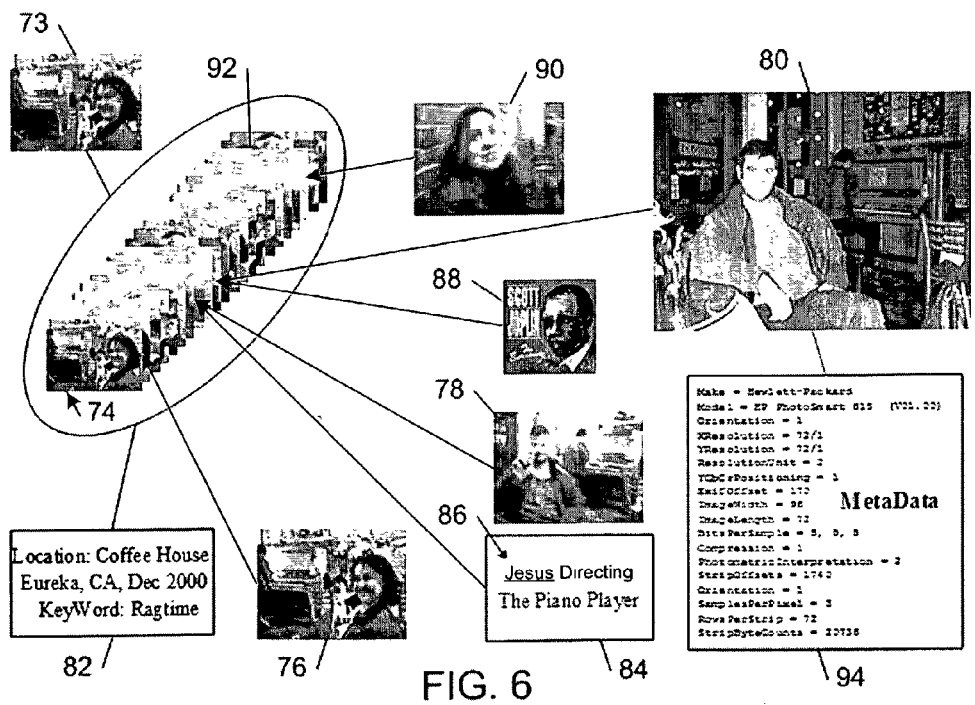
FIG. 6 is a diagrammatic perspective view of the indexed media file, keyframe selection and high resolution still photograph of FIG. 5, along with multiple user-selected media objects that are linked to respective video frames of the indexed media file.

Referring to FIGS. 5 and 6, in one illustrative embodiment, media file 66 corresponds to a video file sequence 73 of full-motion video frames 74. After automatic keyframe extraction and user-modification, two keyframes 76, 78 and a high resolution still photograph 80 are linked to video file 73. As shown in FIG. 6, in addition to modifying the selection of keyframes 76–80, a user may link other media objects to the video frames 74. For example, the user may link a text file annotation 82 to video file 73. The user also may link an XHTML (Extensible HyperText Markup Language) document 84 to the video frame corresponding to keyframe 78. XHTML document 84 may include a hypertext link 86 that contains the URL (Uniform Resource Locator) for another media object (e.g., a web page). The user also may link an audio file 88 to the video frame corresponding to keyframe 80. In the illustrated embodiment, for example, the linked audio file 88 may correspond to the song being played by a person appearing in the associated video keyframe 80. The user also may link a full-motion video file 90 to a frame 92 of video file 73. In the illustrated embodiment, for example, the linked video file 90 may correspond to a video of a person appearing in the associated video frame 92. The user also may link to the video frame corresponding to keyframe 80 a text file 94 containing meta data relating to the associated video frame 80. For example, in the illustrated embodiment, video frame 80 may correspond to a high-resolution still image and meta data file 94 may correspond to the meta data that was automatically generated by the video camera that captured the high-resolution still image.

Figure 7A:
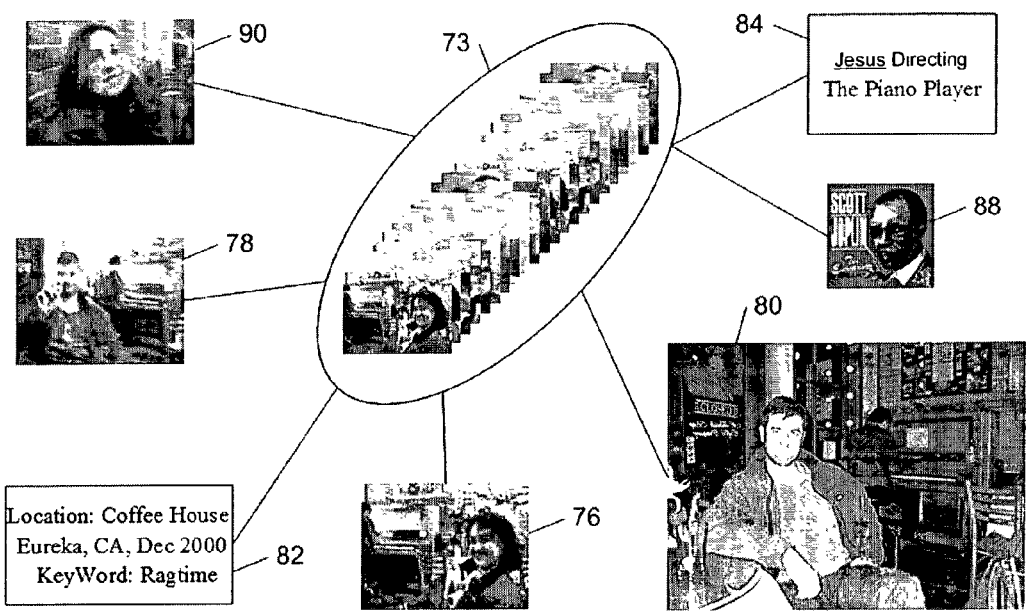
FIG. 7A is a diagrammatic perspective view of the links connecting the keyframes, the high resolution still photograph, and the media objects to the indexed media file of FIG. 6.
Figure 7B:
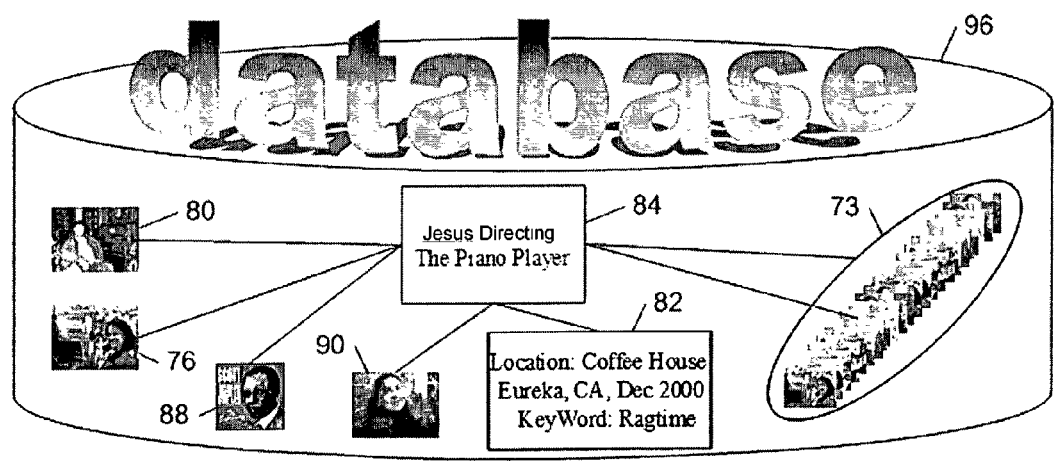
FIG. 7B is a diagrammatic perspective view of a database storing the indexed media file, keyframes, high resolution still photograph, media objects and connecting links of FIG. 7A.

Referring to FIGS. 7A and 7B, in one embodiment, after video file 73 has been enriched with links to other media objects, the resulting collection of media objects and media object linkage data structures (shown in FIG. 7A) may be stored as a context-sensitive, temporally-referenced media database 96 (shown in FIG. 7B). This database 96 preserves temporal relationships and associations between media objects. The database 96 may be browsed in a rich and meaningful way that allows target contents to be found rapidly and efficiently from associational links that may evolve over time. All media objects linked to the video file 73 may share annotations and links with other media objects. In this way, new or forgotten associations may be discovered while browsing through the collection of media objects.

Figure 8A:
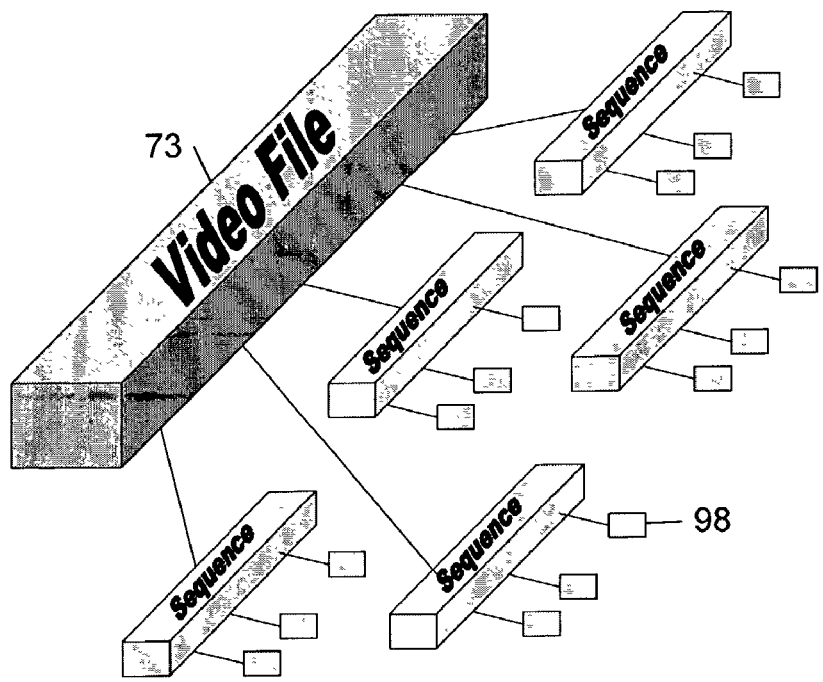
FIG. 8A is a diagrammatic perspective view of a video file mapped into a set of video sequences.
Figure 8B:
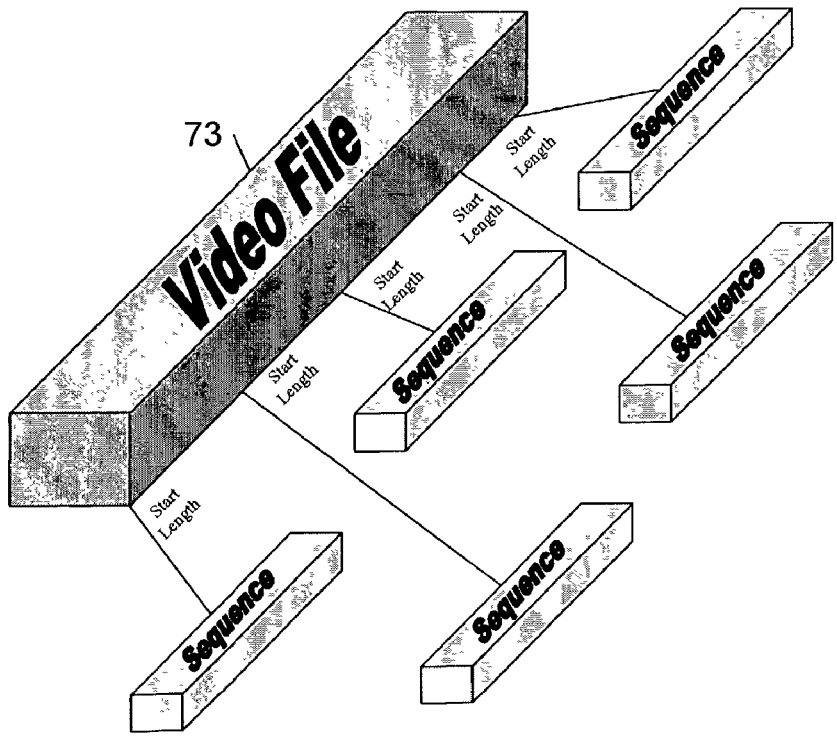
FIG. 8B is a diagrammatic perspective view of a set of video sequences mapped into a common video file.
Figure 8C:
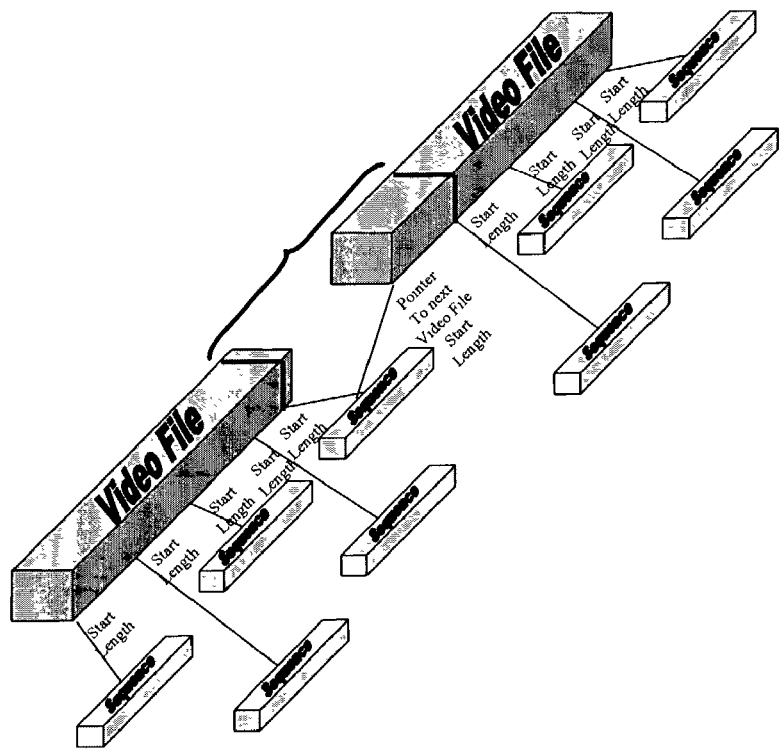
FIG. 8C is a diagrammatic perspective view of a set of consecutive video sequences mapped into two video files.
Figure 8D:
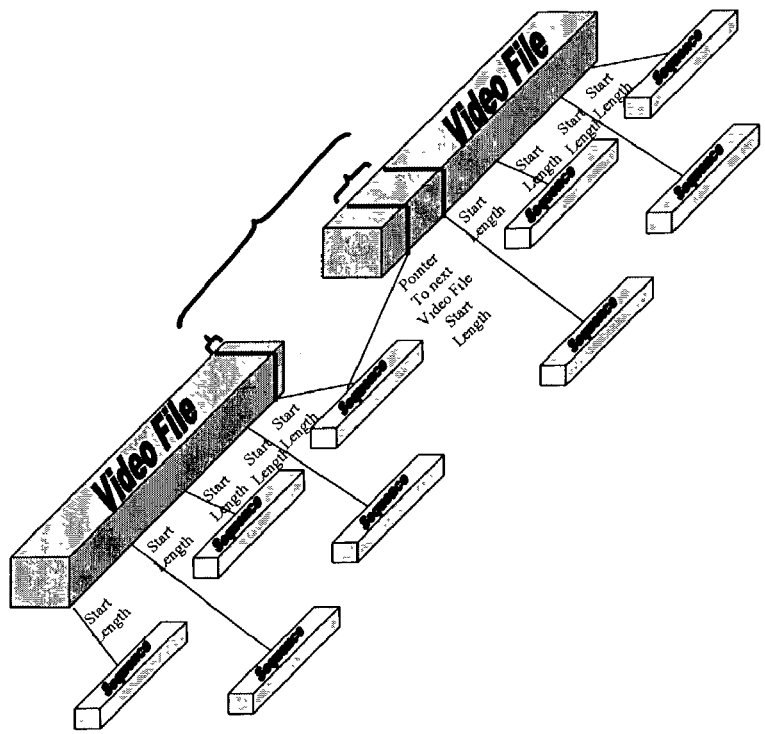
FIG. 8D is a diagrammatic perspective view of a set of non-consecutive video sequences mapped into two video files.

Referring to FIGS. 8A–8D, in some embodiments, all media files in a selected collection are stored only once in data base 96 (FIG. 7B). Each media file (e.g., video file 73) of indexed, temporally-ordered data structures may be split logically into a set of data structure sequences that are indexed with logical links into the corresponding media file. Media objects 98 may be indexed with logical links into the set of data structure sequences, as shown in FIG. 8A. Each data structure sequence link into a media file may identify a starting point in the media file and the length of the corresponding sequence. The data structure sequences may be consecutive, as shown in FIG. 8B, or non-consecutive. In addition, the set of data structure sequences may map consecutively into multiple media files, as shown in FIG. 8C. Alternatively, the set of data structure sequences may be mapped non-consecutively into multiple media files.

Presenting and Browsing a Collection a Media Objects

Figure 9:
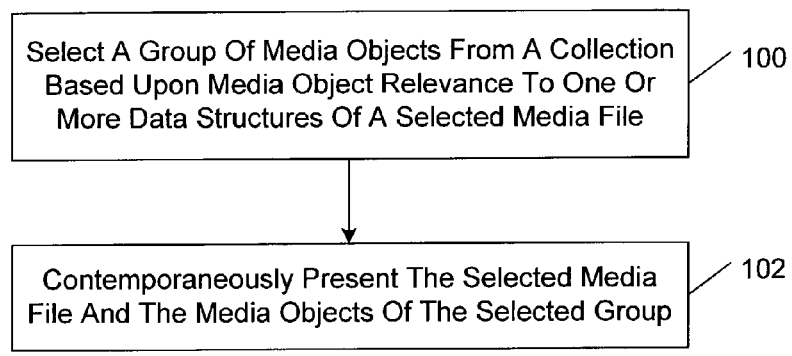
FIG. 9 is a flow diagram of a method of presenting a collection of media objects.

Referring to FIG. 9, in some embodiments, media manager 12 may be configured to present a collection of media objects to a user as follows. A group of media objects is selected from the collection based upon their relevance to one or more data structures of a selected media file of indexed, temporally-ordered data structures (step 100). As explained in detail below, the relevance criterion for selecting media objects may relate to browsable links between media objects and the selected media file, or the relevance criteria may relate to a selected metadata similarity between media objects and the selected media file. Next, the media file and the media objects of the selected group are presented contemporaneously to a user for browsing (step 102). The media file and the media objects preferably are presented to the user through multimedia album page, which is a windows-based GUI that is displayed on display monitor 42 (FIG. 2).

Browsing Media Object Links

In some embodiments, the inter-media-object linking architecture described above may be used by media manager 12 to present the media objects of a collection to a user in a context-sensitive, temporally-referenced way through a multimedia album page 104, which is anchored to a selected media file (e.g., video file 73). For example, media manager 12 may present the data structures of the media file in sequence and, during this presentation, media manager 12 may present media objects in the selected group at times when they are relevant to the data structure (or data structure sequence) currently being presented to the user. In these embodiments, the relevance criterion for selecting the group of objects contemporaneously with the media file relates to the existence of browsable links between the selected media objects and data structures of the media file. The browsable links may be established automatically by media manager 12 and modified by a user, as described above. The browsable links also may be established by media manager 12 just before (e.g., during a preprocessing period) or on the fly during the presentation of the media file by instantiating one or more context matching processes (e.g., a face recognition process, a voice recognition process, or other pattern matching process) between the data structures of the media file being presented and the other media objects in the collection.

Figure 10A:
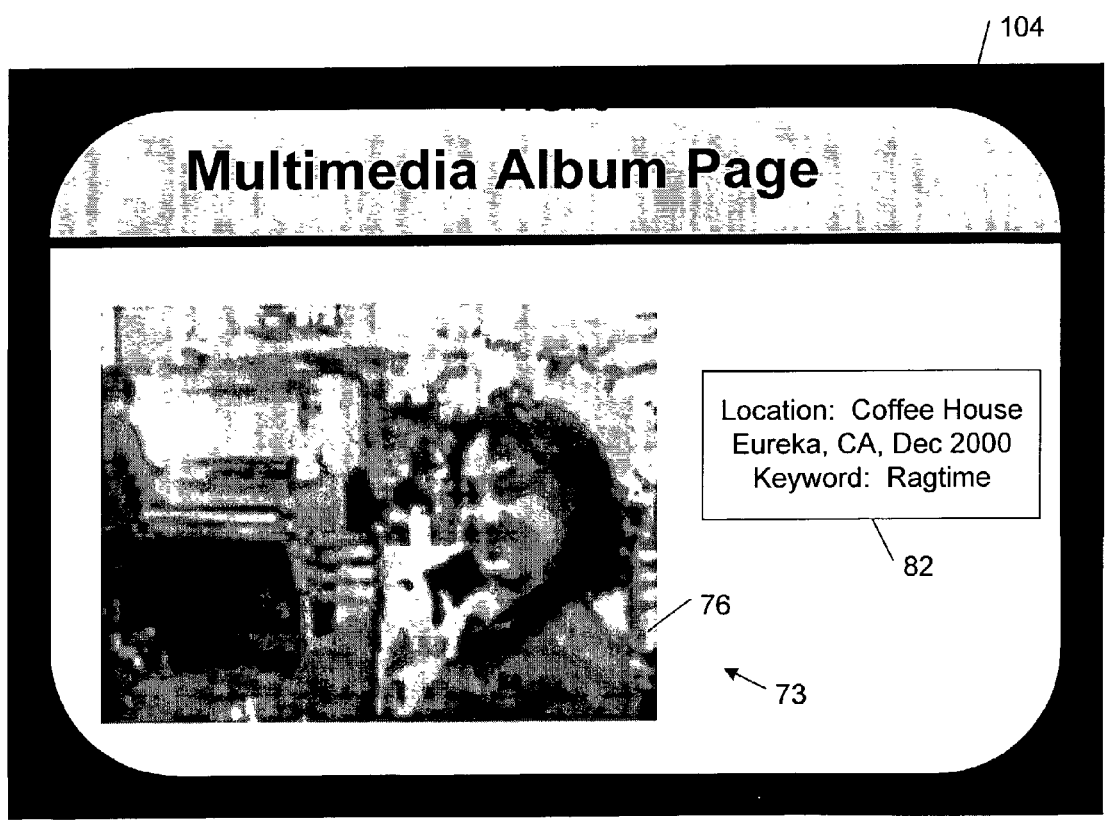
FIGS. 10A–10C are diagrammatic views of a multimedia album page during presentation of a video file and a selected group of media objects that are linked to the video frames of the video file.

Referring to FIG. 10A, in one illustrative embodiment, the media file of indexed, temporally-ordered data structures being presented by media manager 12 corresponds to video file sequence 73. Initially, media manager 12 may present the video file 73 to a user by displaying the first keyframe 76 of the video file sequence. In addition, media manager 12 may simultaneously present the text file annotation 82, which is linked directly to keyframe 76. Text file annotation 82 may be presented only during the presentation of keyframe 76, or it may be presented during the presentation of keyframe 76 and for some prescribed time after keyframe 76 has been presented. The text file annotation presentation period preferably is shorter than the presentation period of the entire video file sequence 73. In the illustrated embodiment, text file annotation file 82 is presented only when keyframe 76 is presented.

Figure 10B:
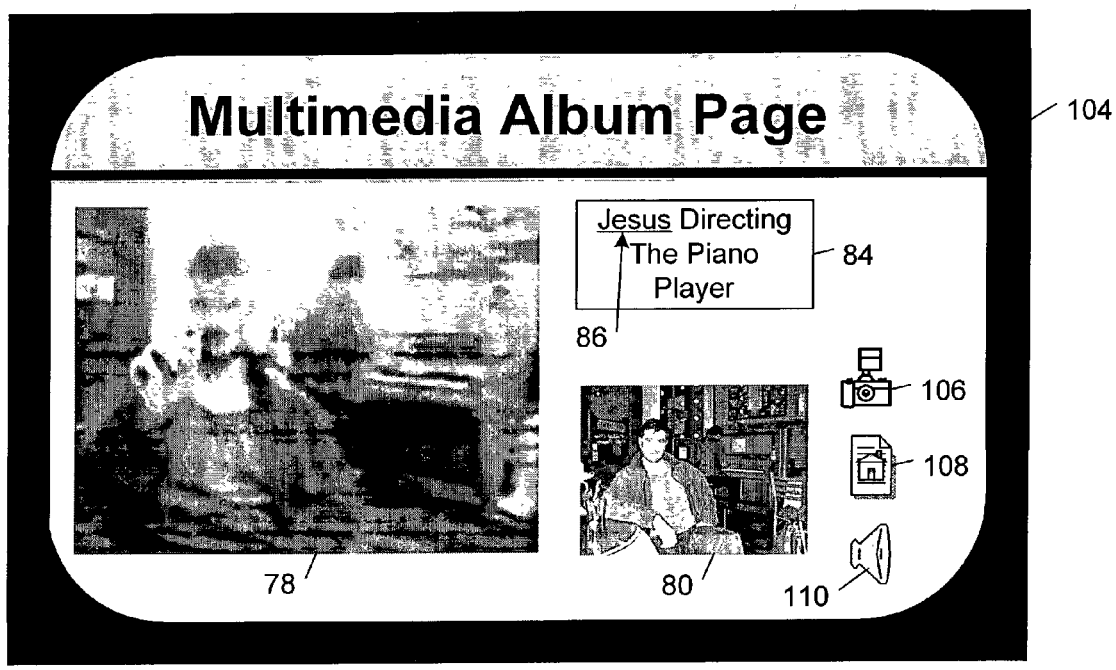

Referring to FIG. 10B, media manager 12 presents the frames of video file 73 to a user in sequence. When one or more media object links to a video frame are detected, media manager 12 presents to the user the linked media objects along with the corresponding linked video frame. In the illustrated embodiment, when video frame 78 is displayed, media manager 12 also displays the text file annotation 84, which is linked directly to video frame 88. A user may jump from multimedia album page 104 to another page (e.g., another multimedia album page, a web page, or some other media object) by selecting hypertext link 86 that is associated with text file annotation 84.

Media manager 12 also may determine that another media object 80 in the collection is relevant to the context of video frame 78. For example, media manager 12 may instantiate a face recognition process to find a match between the person displayed in video frame 78 and the person displayed in media object 80. In the illustrated embodiment, the relevant media object identified by media manager 12 corresponds to high resolution still photograph 80; in other embodiments, however, the identified media object may correspond to a different media object. Media manager 12 preferably displays the identified media object 80 only as long as it is relevant to the context currently being presented (e.g., as long as the same person appears in the presented video frames). In addition to displaying media object 80, media manager 12 displays graphical representations of links to media objects that are linked to media object 80. In the illustrated embodiment, media manager 12 displays a link 106 to a another page for displaying a larger version of the high resolution still photograph, a link 108 to an Internet web page corresponding to the home page of the person displayed in the high resolution photograph, and a link 110 to an audio file relating to the person displayed in the high resolution photograph (e.g., a voice greeting recorded by the displayed person). A user may select one or more of the hyperlinks 106–110 to jump from multimedia album page 104 to the corresponding linked media objects.

Figure 10C:
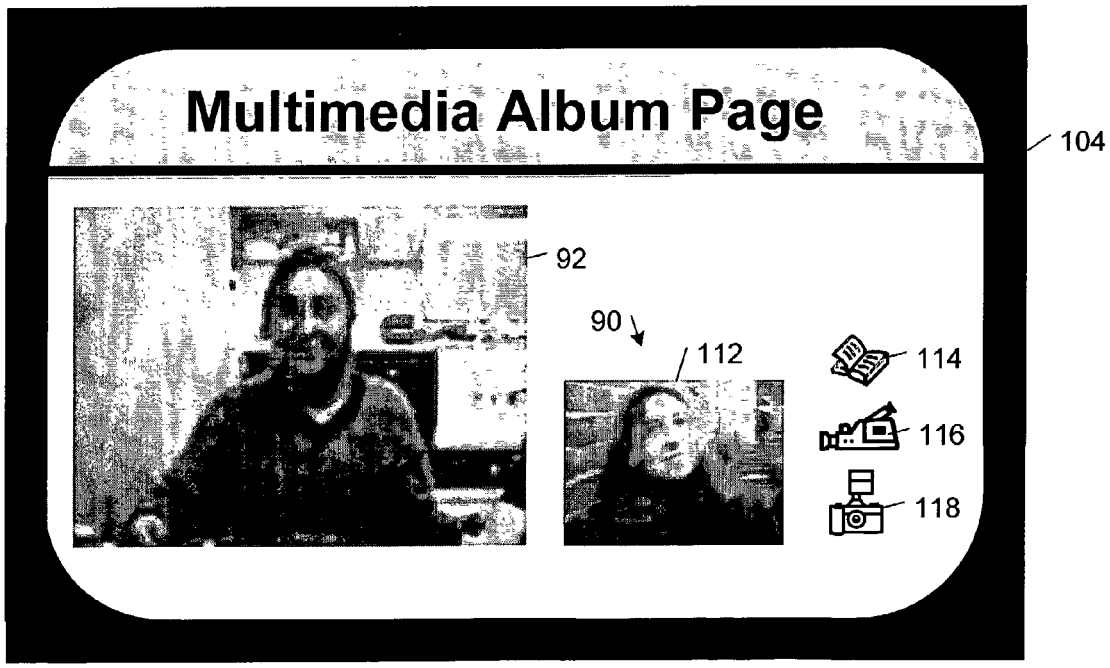

As shown in FIG. 10C, when the context changes, media manager 12 discontinues the presentation of media objects 80, 84. When a new media object link is detected or when a new relevant media object is identified, media manager 12 presents a new media object 90 in the multimedia album page 104. In the illustrated embodiment, media object 90 corresponds to a video file that is represented by a keyframe 112 showing a person with a face that matches the person being displayed in a frame 92 of video file 73. Media manager 12 also displays graphical representations of links to media objects that are linked to media object 90. In the illustrated embodiment, media manager 12 displays a link 114 to a multimedia album page corresponding to media object 90, a link 116 to a window for presenting the video file 92, and a link 118 to an Internet web page corresponding to the home page of the person displayed in keyframe 112. A user may select one or more of the hyperlinks 114–118 to jump from multimedia album page 104 to the corresponding linked media objects.

Thus, in these embodiments, during presentation of a selected media file of indexed, temporally-ordered data structures a user may navigate through a collection of associated media objects by activating the links that are displayed to the user in a way that is context-sensitive and temporally-referenced to the playback of the selected media file of indexed, temporally-ordered data structures. In this way, new or forgotten associations may be discovered while browsing through the collection of media objects.

Browsing a Media Object Cluster Hierarchy

In some embodiments, the relevance criteria used to select the media objects that will be presented contemporaneously with the selected media file may relate to a selected metadata similarity between media objects and the selected media file. The metadata similarity may correspond to low-level features (e.g., motion activity, texture or color content, and audio content) or high-level features (e.g., meta data, such as keywords and names; objects, such as persons, places and structures; and time-related information, such as playback length and media object creation date). One or more known media object processing techniques (e.g., pattern recognition techniques, voice recognition techniques, color histogram-based techniques, and automatic pan/zoom motion characterization processing techniques) may be used to compare media objects to the selected media file in accordance with the selected metadata similarity criterion. In response to a user's indication to organize media objects in accordance with a selected metadata similarity criterion, media manager 12 selects a group of media objects having the highest metadata similarity to a selected media file. Media manager 12 then contemporaneously presents the selected media file and the media objects of the selected group.

Figure 11:
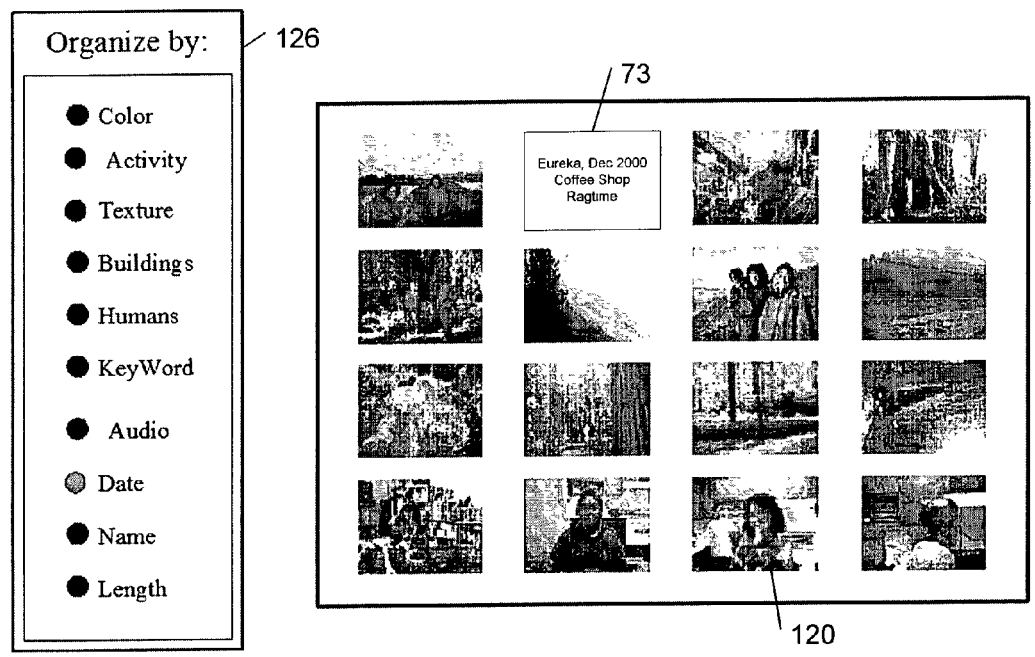
FIG. 11 is a diagrammatic view of a graphical user interface simultaneously presenting a selected video file and a group of media objects selected based upon a metadata similarity criterion.
Figure 12:
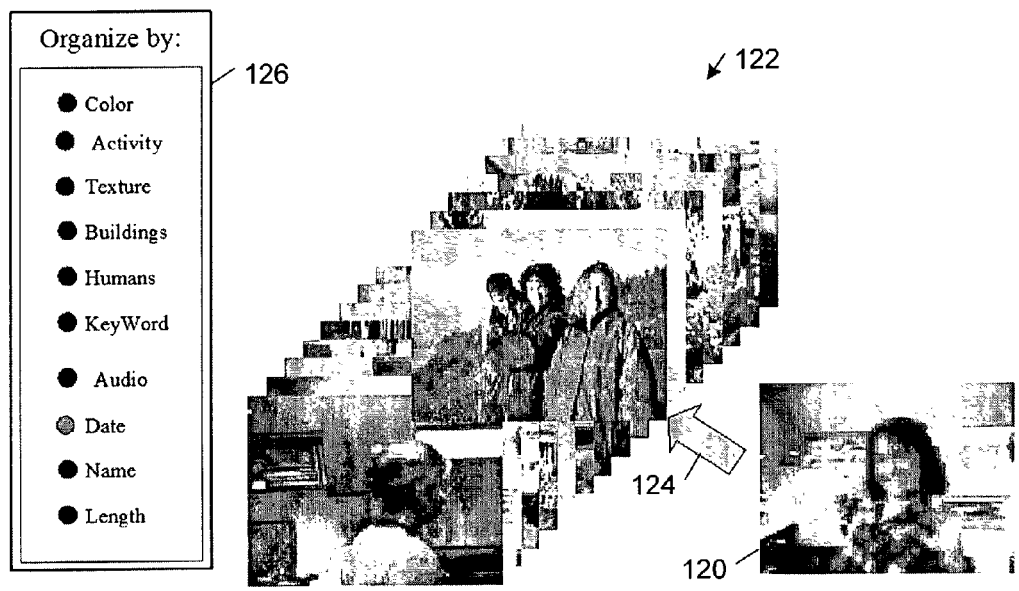
FIG. 12 is a diagrammatic view of a graphical user interface presenting the media objects of FIG. 11 as a video card stack adjacent to the selected video file.

As shown in FIG. 11, in these embodiments, the media objects of the selected group may be presented simultaneously around a selected media file 120. Alternatively, as shown in FIG. 12, the media objects of the selected group may be presented in the form of a media object stack 122. Individual media objects within the media object stack may be selected for comparison with the selected media file 120 by, for example, a pointer 124. In the illustrated embodiment, each of the selected media objects corresponds to a video file; in other embodiments, however, one or more of the selected media objects may be non-video media objects. A user may select a metadata similarity criterion in accordance with which media manager 12 will organize the presentation of media objects by selecting one of the metadata similarity buttons contained in an "Organize by" window 126.

Figure 13:
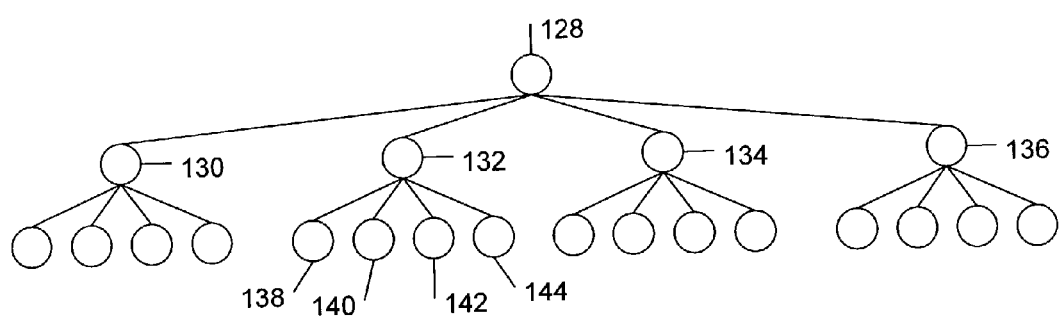
FIG. 13 is a hierarchical arrangement of media objects that are grouped into clusters based upon one or more media object relevance criteria.

Referring to FIG. 13, in some embodiments, the media objects in the collection may be organized into a cluster hierarchy for each metadata similarity hierarchy. In this way, a user may efficiently browse through a large collection of media objects that are sorted in accordance with a context that is relevant to the user. In these embodiments, the media objects are grouped into clusters, each of which preferably contains a fixed number of media objects (e.g., the number of media objects that may be conveniently presented to a user at the same time). The media objects in each cluster preferably are all sufficiently similar to logically be placed in the same cluster. In general, the media objects of a cluster at one level in the hierarchy are represented by a single media object in a cluster at the next higher level. Thus, in the illustrated embodiment, media object 128 represents the cluster of media objects 130, 132, 134, 136, and media object 130 represents the cluster of media objects 138, 140, 142, 144. The representative media object may be determined statistically. For example, the media objects may be ordered in accordance with a selected context criterion, and the representative media object may correspond to the centroid or some other statistically-weighted average of a selected cluster of the ordered media objects.

In operation, a user may select (or anchor) a media object (e.g., video file 120) and organize the collection of media objects in accordance with a selected metadata similarity criteria (e.g., "Date" in FIGS. 11 and 12). In response, media manager 12 selects a group of media objects having the highest metadata similarity to the anchored media object (e.g., media objects that were created nearest in time to the date the anchored media file was created). The selected group of media objects are presented to the user either simultaneously, as shown in FIG. 11, or as a video card stack, as shown in FIG. 12. The user may browse through the presented media objects (e.g., playback one or more of the video files) or the user may jump to another presentation view. For example, the user may navigate through the media objects linked to video file 73, or the user may drill down into a media object cluster represented by one of the high level media objects in the selected group that is currently being presented to the user.

In some embodiments, a user may navigate through the collection of media objects without anchoring a particular media object. For example, in response to a user's selection of a desired metadata similarity criterion, media manager 12 may automatically organize the collection of media objects into a browsable metadata similarity hierarchy. In one illustrative example, a user may select to organize the media object collection in terms of color content. In response, media manager 12 performs a color histogram analysis (e.g., RGB or YUV color histogram analysis) to generate a cluster hierarchy in which each lower level cluster is represented by a media object in a higher level cluster. Media manager 12 presents the highest level of the media object cluster hierarchy for browsing by the user. In this example, the highest level media objects may represent respective media object clusters having different respective color profiles (e.g., predominantly green, predominantly red, etc.). The user may then may direct media manager 12 to perform one or more of the following actions with respect to a selected one of the presented media objects: show the current scene; show the next scene; show the previous scene; show a slide show summary of the media object; show a photo album presentation of the media object; show a slide show presentation of the media object; navigate into a cluster represented by the selected media object; and navigate out of a cluster containing the selected media object. The user may drill down through the entire cluster hierarchy, or the user may select another metadata similarity criterion on which to organize the media object collection. At any stage during this process, the user may anchor a particular media object and organize the media object collection around the anchored media object in accordance with one or more selected metadata similarity criteria.

The systems and methods described herein are not limited to any particular hardware or software configuration, but rather they may be implemented in any computing or processing environment, including in digital electronic circuitry or in computer hardware, firmware or software. These systems and methods may be implemented, in part, in a computer program product tangibly embodied in a machine-readable storage device for execution by a computer processor. In some embodiments, these systems and methods preferably are implemented in a high level procedural or object oriented programming language; however, the algorithms may be implemented in assembly or machine language, if desired. In any case, the programming language may be a compiled or interpreted language. The media object management methods described herein may be performed by a computer processor executing instructions organized, e.g., into program modules to carry out these methods by operating on input data and generating output. Suitable processors include, e.g., both general and special purpose microprocessors. Generally, a processor receives instructions and data from a read-only memory and/or a random access memory. Storage devices suitable for tangibly embodying computer program instructions include all forms of non-volatile memory, including, e.g., semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially-designed ASICs (application-specific integrated circuits).

Other embodiments are within the scope of the claims.

What is claimed is:

1. A method, comprising:
    accessing a video file, media objects, and links, wherein the video file contains a sequence of full-motion video frames, each of the media objects comprises respective content corresponding to at least one of visual content and audio content, and each of the links connects a respective index value associated with a respective one of the video frames with an address of a corresponding one of the media objects;
    rendering the video frames of the video file in sequence in a region of a display; and
    during the rendering of each of the video frames connected to a corresponding one of the media objects by a respective one of the links, automatically rendering the respective content of the corresponding media object contemporaneously with the rendering of the connected video frame, wherein the automatically rendering comprises rendering the visual content of respective ones of the corresponding media objects in regions of the display outside the region of the display where the video frames are being rendered.

2. The method of claim 1, wherein the automatically rendering comprises rendering the respective content of the corresponding media object contemporaneously with the rendering of the connected video frame without inducement by user input.

3. The method of claim 1, wherein the rendering comprises rendering each of the video frames of the video file within a respective presentation period and the automatically rendering comprises rendering the respective content of the corresponding media objects during respective media object presentation periods, wherein one or more of the media object presentation periods are longer than the presentation periods of respective ones of the video frames of the video file that are connected to the corresponding media objects.

4. The method of claim 1, wherein the automatically rendering comprises displaying one or more user-selectable links from one of the media objects whose content is being rendered to other media objects in a collection.

5. The method of claim 1, further comprising without inducement by user input automatically selecting one or more similar media objects from a collection of media objects based upon similarity of metadata respectively associated with the media objects in the collection to corresponding metadata associated with respective ones of the video frames of the video file.

6. The method of claim 5, wherein the automatically selecting comprises selecting the one or more similar media objects based on at least one metadata similarity selected from color similarity, motion activity similarity, texture content similarity, audio similarity, data similarity, and name similarity.

7. The method of claim 5, wherein the automatically selecting comprises determining similarity of objects appearing in ones of the media objects in the collection to objects appearing in respective ones of the video frames of the video file.

8. The method of claim 7, wherein the automatically selecting comprises determining similarity of persons and places appearing in ones of the media objects in the collection to persons and places appearing in respective ones of the video frames of the video file.

9. The method of claim 5, wherein the selecting comprises selecting from the collection ones of the similar media objects having highest metadata similarity to the one or more video frames of the video file.

10. The method of claim 9, wherein the selecting comprises selecting only a predetermined number of the similar media objects from the collection.

11. The method of claim 5, further comprising presenting the one or more selected similar media objects on the display simultaneously with the rendering of corresponding similar ones of the video frames of the video file.

12. The method of claim 11, wherein the presenting comprises displaying respective graphical representations of the one or more selected similar media objects in spatial regions of the display adjacent to the region of the display where the video frames of the video file are being rendered.

13. The method of claim 11, wherein the displaying comprises displaying a stack of the respective graphical representations of the one or more selected similar media objects.

14. The method of claim 5, further comprising grouping the media objects in the collection into one or more clusters based upon one or more metadata similarity criteria corresponding to respective measures of similarity between metadata respectively associated with the media objects in the collection.

15. The method of claim 14, wherein the grouping comprises grouping the media objects in the collection into clusters having an equal number of media objects.

16. The method of claim 14, wherein the grouping comprises assigning the media objects in the collection to respective clusters based upon degree of similarity of one or more metadata respectively associated with the media objects in the collection.

17. The method of claim 16, wherein the grouping further comprises arranging the media object clusters into a respective cluster hierarchy for each of the one or more metadata similarity criteria, wherein, in each cluster hierarchy, each cluster in a lower level of the hierarchy is represented by a respective media object in a cluster in a higher level of the hierarchy adjacent the lower level.

18. The method of claim 17, further comprising, for each cluster hierarchy, selecting ones of the media objects in clusters in a higher level of the cluster hierarchy as representatives of respective ones of the media object clusters in a lower level of the cluster hierarchy adjacent the higher level based upon an ordering of the media objects in the collection in accordance with one or more of the metadata similarity criteria.

19. The method of claim 18, further comprising presenting all the media objects of a given one of the represented media object clusters in response to user selection of the respective media object representing the given media object cluster.

20. The method of claim 1, wherein each of the links is browsable from a given one of the video frames of the video file to a connected one of the media objects and from the connected media object to the given video frame.

21. The method of claim 1, wherein each of the media objects comprises respective content corresponding to at least one of the following media object types: text, audio, graphics, animated graphics, and full-motion video.

22. The method of claim 1, wherein the accessing comprises accessing the media objects across multiple computer networks.

23. A machine-readable medium storing machine-readable instructions causing a machine to perform operations comprising:
   accessing a video file, media objects, and links, wherein the video file contains a sequence of full-motion video frames, each of the media objects comprises respective content corresponding to at least one of visual content and audio content, and each of the links connects a respective index value associated with a respective one of the video frames with an address of a corresponding one of the media objects;
   rendering the video frames of the video file in sequence in a region of a display; and
   during the rendering of each of the video frames connected to a corresponding one of the media objects by a respective one of the links, automatically rendering the respective content of the corresponding media object contemporaneously with the rendering of the connected video frame, wherein the media manager automatically renders the visual content of respective ones of the corresponding media objects in regions of the display outside the region of the display where the video frames are being rendered.

24. The machine-readable medium of claim 23, wherein the machine-readable instructions cause the machine to automatically select without inducement by user input one or more similar media objects from a collection of media objects based upon similarity of metadata respectively associated with the media objects in the collection to corresponding metadata associated with respective ones of the video frames of the video file.

25. A method, comprising:
   grouping media objects in a collection into multiple clusters based upon one or more media object relevance criteria, wherein each of the media objects comprises respective content corresponding to at least one of visual content and audio content, and the grouping comprises assigning the media objects in the collection to respective clusters based upon degree of similarity of one or more metadata respectively associated with the media objects in the collection;
   arranging the media object clusters into a cluster hierarchy of two or more levels, wherein each cluster in a lower level of the hierarchy is represented by a respective media object in a cluster in a higher level of the hierarchy adjacent the lower level, wherein the arranging comprises arranging the media object clusters into a respective cluster hierarchy for each of one or more metadata similarity criteria corresponding to respective measures of similarity between metadata respectively associated with the media objects in the collection; and
   contemporaneously presenting all the media objects in a given one of the clusters in response to user selection of the respective media object representing the given media object cluster.

26. The method of claim 25, further comprising, for each cluster hierarchy, selecting ones of the media objects in clusters in a higher level of the cluster hierarchy as representatives of respective ones of the media object clusters in a lower level of the cluster hierarchy adjacent the higher level based upon an ordering of the media objects in the collection in accordance with one or more of the metadata similarity criteria.

27. A machine-readable medium storing machine-readable instructions causing a machine to perform operations comprising:
   grouping media objects in a collection into multiple clusters based upon one or more media object relevance criteria, wherein each of the media objects comprises respective content corresponding to at least one of visual content and audio content, and the grouping comprises assigning the media objects in the collection to respective clusters based upon degree of similarity of one or more metadata respectively associated with the media objects in the collection;
   arranging the media object clusters into a cluster hierarchy of two or more levels, wherein each cluster in a lower level of the hierarchy is represented by a respective media object in a cluster in a higher level of the hierarchy adjacent the lower level, wherein the arranging comprises arranging the media object clusters into a respective cluster hierarchy for each of one or more metadata similarity criteria corresponding to respective measures of similarity between metadata respectively associated with the media objects in the collection; and
   contemporaneously presenting all the media objects in a given one of the clusters in response to user selection of the respective media object representing the given media object cluster.

* * * * *

UNITED STATES PATENT AND TRADEMARK OFFICE
CERTIFICATE OF CORRECTION

PATENT NO. : 7,149,755 B2  Page 1 of 1
APPLICATION NO. : 10/207279
DATED : December 12, 2006
INVENTOR(S) : Pere Obrador It is certified that error appears in the above-identified patent and that said Letters Patent is hereby corrected as shown below:

On the Title page, in field (73), in "Assignee", in column 1, line 2, delete "LP." and insert -- L.P. --, therefor.

In column 2, line 23, before "number" insert -- identification --.

In column 4, line 38, after "provider 26," delete "is".

Signed and Sealed this

Eighth Day of December, 2009

David J. Kappos
*Director of the United States Patent and Trademark Office*